(12) United States Patent
Kadowaki

(10) Patent No.: US 10,165,187 B2
(45) Date of Patent: Dec. 25, 2018

(54) CORRECTION OPTICAL DEVICE AND IMAGING DEVICE

(71) Applicant: Panasonic Intellectual Property Management Co., Ltd., Osaka (JP)

(72) Inventor: Keita Kadowaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/765,278

(22) PCT Filed: Mar. 8, 2017

(86) PCT No.: PCT/JP2017/009128
§ 371 (c)(1),
(2) Date: Apr. 2, 2018

(87) PCT Pub. No.: WO2017/154944
PCT Pub. Date: Sep. 14, 2017

(65) Prior Publication Data
US 2018/0288331 A1 Oct. 4, 2018

(30) Foreign Application Priority Data
Mar. 10, 2016 (JP) .................................. 2016-047179

(51) Int. Cl.
*H04N 5/232* (2006.01)
*G03B 17/56* (2006.01)
*H04N 5/225* (2006.01)

(52) U.S. Cl.
CPC ....... *H04N 5/23287* (2013.01); *G03B 17/568* (2013.01); *H04N 5/2251* (2013.01); *G03B 2217/002* (2013.01)

(58) Field of Classification Search
CPC ............. H04N 5/23287; H04N 5/2251; G03B 17/568; G03B 2217/002
See application file for complete search history.

(56) References Cited

U.S. PATENT DOCUMENTS 9,221,679 B2 * 12/2015 Dar ........................ G01P 21/00
9,335,396 B2 * 5/2016 Debeurre .............. B81C 99/005
(Continued)

FOREIGN PATENT DOCUMENTS

JP           2014-115350         6/2014

OTHER PUBLICATIONS

International Search Report of PCT application No. PCT/JP2017/009128 dated May 30, 2017.

*Primary Examiner* — Antoinette T Spinks
(74) *Attorney, Agent, or Firm* — Wenderoth, Lind & Ponack, L.L.P.

(57) ABSTRACT

A correction optical device comprises an OIS frame, and an OIS lock ring that restricts a movement of the OIS frame. The OIS lock ring rotates so that a position of a first protrusion reciprocates between a lock position and an unlock position. The first protrusion and the second protrusion are formed into such shapes that generate a component force acting on the first protrusion in a direction from the unlock position toward the lock position when a force causing the first protrusion and the second protrusion to push against each other is generated between the first protrusion and the second protrusion.

10 Claims, 11 Drawing Sheets

(56) References Cited

U.S. PATENT DOCUMENTS

| 9,519,201 B2* | 12/2016 | Kamada | G03B 17/02 |
| 2013/0076922 A1* | 3/2013 | Shihoh | G02B 27/64 |
| | | | 348/208.4 |
| 2014/0160566 A1 | 6/2014 | Shihoh | |

* cited by examiner

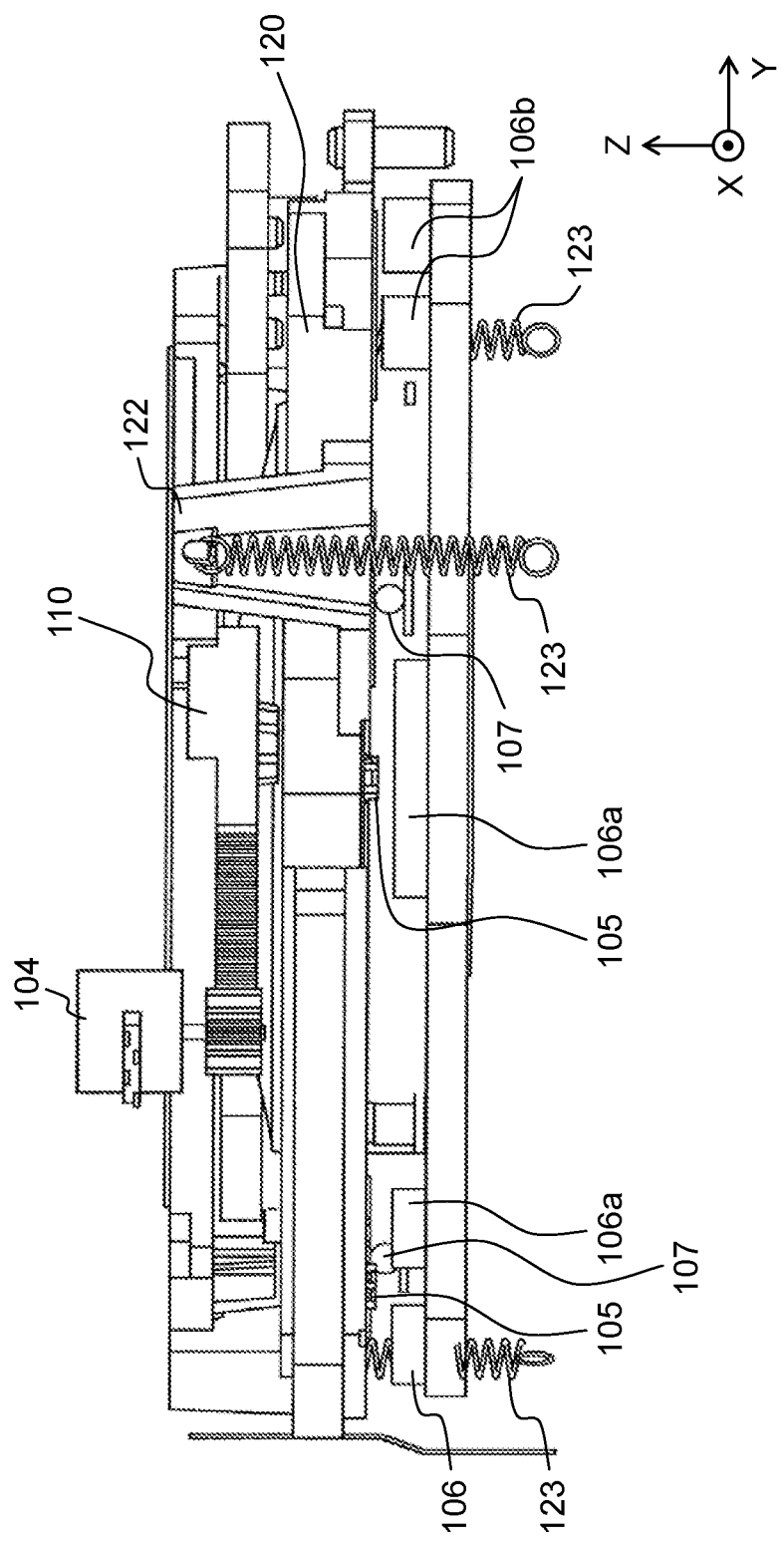

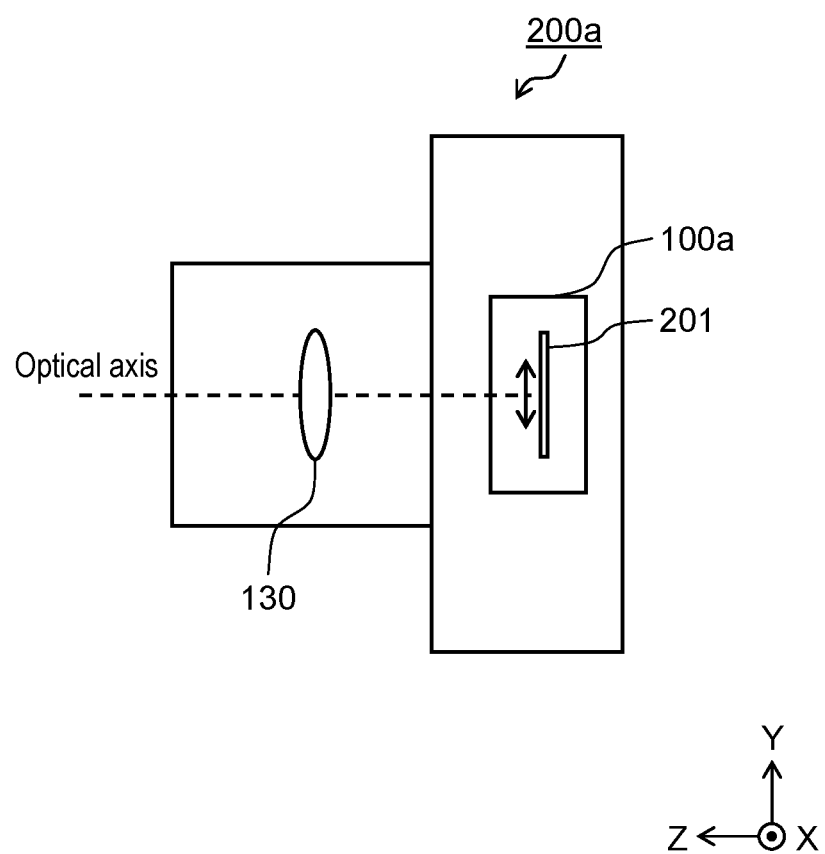

CORRECTION OPTICAL DEVICE AND IMAGING DEVICE

This application is a U.S. national stage application of the PCT international application No.PCT/JP2017/009128 filed on Mar. 8, 2017, which claims the benefit of foreign priority of Japanese patent application No. 2016-047179 filed on Mar. 10, 2016, the contents all of which are incorporated herein by reference.

TECHNICAL FIELD

The present disclosure relates to a correction optical device for correcting an image blur and an imaging apparatus equipped with the correction optical device.

BACKGROUND ART

Such a conventional correction optical device has been proposed that is equipped in an imaging apparatus and corrects blurring of an image taken by the imaging apparatus (see, for example, PTL 1).

This correction optical device has a lens, a slide plate that holds the lens, and a rotary ring. The slide plate moves translationally in a plane perpendicular to the optical axis of the correction optical device based on a signal from an acceleration sensor provided in the imaging apparatus to correct blurring of an image received by an imaging element through the lens.

For example, when the image stabilization function is turned on, the rotary ring rotates to disengage a protrusion formed on the rotary ring from a protrusion formed on the slide plate. In this state, the slide plate is unlocked to be translationally movable. Accordingly, the correction optical device can perform the image blur correction.

On the other hand, when the image stabilization function is turned off, the rotary ring rotates in the reverse direction to engage the protrusion formed on the rotary ring with the protrusion formed on the slide plate. In this state, the slide plate is locked to restrict the translational movement of the slide plate. Accordingly, the correction optical device stops the image blur correction.

CITATION LIST

Patent Literature

PTL 1: Unexamined Japanese Patent Publication No. 2014-115350

SUMMARY OF THE INVENTION

However, the correction optical device disclosed in PTL 1 has a problem that its structure becomes complicated.

A correction optical device in one aspect of the present disclosure is a correction optical device for correcting an image blur. This correction optical device comprises a movable member, and a restriction member. The movable member moves along a plane perpendicular to an optical axis of the correction optical device to change a relative positional relation between a lens and an image sensor which receives light through the lens. The restriction member is disposed rotatably about an axis parallel to the optical axis. The restriction member restricts a movement of the movable member. The restriction member rotates so that a first protrusion formed on the restriction member reciprocates between a restricting position and a releasing position. When the first protrusion is in the restricting position, the first protrusion and a second protrusion formed on the movable member oppose to each other. This restricts a movement of the movable member along an opposing direction in which the first and second protrusions oppose to each other. When the first protrusion is in the releasing position, the first protrusion and the second protrusion do not oppose to each other. This releases the restriction of the movement of the movable member along the opposing direction. The first and second protrusions have such shapes that generate a component force acting on the first protrusion in a direction from the releasing position toward the restriction position when a force causing the first protrusion and the second protrusion to push against each other along the opposing direction is generated between the first and second protrusions.

It is possible by the correction optical device of the present disclosure to simplify its structure.

BRIEF DESCRIPTION OF DRAWINGS

FIG. 5 is a side view illustrating the correction optical device in accordance with the exemplary embodiment.

FIG. 10 is a diagram illustrating a configuration of an imaging apparatus in accordance with a modification of the exemplary embodiment.

DESCRIPTION OF EMBODIMENT

Figure 1:
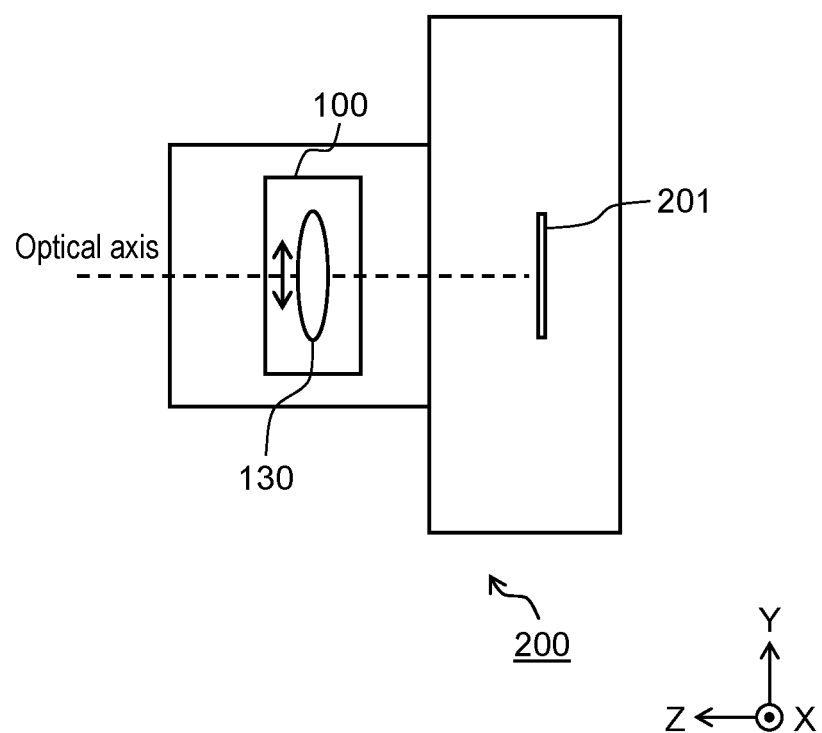
FIG. 1 is a diagram illustrating a schematic configuration of an imaging apparatus in accordance with an exemplary embodiment.

Underlying Knowledge Forming Basis of the Present Disclosure

The inventor founds that the correction optical devices like the one as disclosed in PTL 1 have the problems as described below.

If the slide plate is in the unlocked state when the imaging apparatus is in the power-off state, the slide plate sometimes shakes due to a vibration of the imaging apparatus to cause rattling sounds. A user hearing the rattling sounds sometimes erroneously recognizes that the imaging apparatus is broken. Accordingly, it is preferable to keep the slide plate in the locked state when the imaging apparatus is in the power-off state. This prevents the slide plate from shaking even if the imaging apparatus is vibrated during the power-off state.

In the case of the correction optical device disclosed in PTL 1, the rotary ring is kept in a specified position when the slide plate is in the locked state. In other words, the rotary ring is fixed or retained so as not to rotate. Accordingly, the rotary ring is prevented from being rotated even if the vibration of the imaging apparatus is large or the vibration repeats for a relatively long time. This prevents the slide plate from unintentionally shifting from the locked state to the unlocked state, even when the vibration of the imaging apparatus in the power-off state is large.

Generally, it is necessary for positioning the rotary ring to use such a member as a ball plunger or the like. It is also necessary to form a groove on the rotary ring for receiving the ball of the ball plunger.

Therefore, there is a problem that the structure of the correction optical device becomes complicated.

A correction optical device in one aspect of the present disclosure is a correction optical device for correcting an image blur. This correction optical device comprises a movable member, and a restriction member. The movable member moves along a plane perpendicular to an optical axis of the correction optical device to change a relative positional relation between a lens and an image sensor which receives light through the lens. The restriction member is disposed rotatably about an axis parallel to the optical axis. The restriction member restricts a movement of the movable member. The restriction member rotates so that a first protrusion formed on the restriction member reciprocates between a restricting position and a releasing position. When the first protrusion is in the restricting position, the first protrusion and a second protrusion formed on the movable member oppose to each other. This restricts a movement of the movable member along an opposing direction in which the first and second protrusions oppose to each other. When the first protrusion is in the releasing position, the first protrusion and the second protrusion do not oppose to each other. This releases the restriction of the movement of the movable member along the opposing direction. The first and second protrusions have such shapes that generate a component force acting on the first protrusion in a direction from the releasing position toward the restriction position when a force causing the first and second protrusions to push against each other along the opposing direction is generated between the first and second protrusions.

According to the correction optical device in one aspect of the present disclosure, when a force causing the first and second protrusions to push against each other is generated between the first protrusion and the second protrusion due to a vibration or the like, such a component force is generated that acts on the first protrusion in the direction from the releasing position toward the restricting position. This prevents the restriction of the movable member from being unintentionally released by such a rotation of the restriction member that causes the first protrusion to move to the releasing position. According to the shapes of the first and second protrusions of the present disclosure, it is possible to prevent the restriction of the movable member from being unintentionally released as described above, without using an additional member such, for example, as a ball plunger or the like. Accordingly, the correction optical device can be made simple in structure.

For example, the shapes of the first and second protrusions viewed from the direction of the optical axis may be such that, when the first protrusion is in the restricting position and the first protrusion and the second protrusion are in contact with each other, a tangent line to the first and second protrusions is inclined so that a releasing position side of the tangent line is closer to the rotational center than a restricting position side of the tangent line.

This makes it possible to easily and appropriately generate the above-mentioned component force acting in the direction from the releasing position toward the restricting position.

Also, contour shapes of the first protrusion and the second protrusion passing through a contact point of the first and second protrusions viewed from the direction of the optical axis may be arcs.

Also, the radius of the arc of the first protrusion may be larger than the radius of the arc of the second protrusion.

Also, the movable member may hold the lens, and may move in the state of holding the lens.

Also, the restriction member may have a ring portion having an approximately annular shape, and a plurality of first protrusions. The first protrusions are protruding from the periphery of the ring portion. The movable member may have a frame portion having an approximately annular shape, and a plurality of second protrusions. The approximately annular shape frame portion holds the lens at its center. The second protrusions are protruding from the frame portion in the direction of the optical axis. The lens is exposed from a hollow of the ring portion of the restriction member. The plurality of second protrusions may be arranged on the movable member so as to surround the restriction member.

With the configuration in which the restriction member is surrounded by the plurality of second protrusions, it is possible to restrict the movement of the movable member at or near the center of an area surrounded by the second protrusions.

The correction optical device may further comprise a holding member, and a plurality of balls. The holding member holds the movable member. The plurality of balls are disposed between the movable member and the holding member. Each of the plurality of second protrusions may be connected to the holding member through an elastic member.

With this configuration, the balls roll to allow the movable member to move along the holding member. Also, the movement can be suppressed by the elastic force of the elastic member. As a result, the movable member can be held so as to freely fluctuate. Also, the movable member can be translationally moved by, for example, a magnetic force.

Further, the movable member may hold an image sensor, and may move in the state of holding the image sensor.

Also, an imaging apparatus in another aspect of the present disclosure is an imaging apparatus equipped with the above-described correction optical device.

Accordingly, it is also possible to simplify the entire structure of the imaging apparatus.

Hereinafter, an exemplary embodiment will be described with reference to the drawings.

The exemplary embodiment described hereinbelow shows comprehensive or concrete examples. Numeric values, shapes, materials, components, arrangements and connections of the components, steps, orders of the steps, and so on are merely examples, and are not intended to limit the present disclosure. Also, among the components in the exemplary embodiments described hereinbelow, any components that are not described in any independent claims are explained as arbitrary components.

Also, each FIGURE illustrates a schematic diagram, and is not necessarily drawn accurately. Like components are referred to by like reference marks throughout the drawings. Also, in the exemplary embodiment described hereinbelow, such expressions as approximately annular shape, approximately cylindrical shape, and approximately constant intervals are used. For example, the expression "approximately constant intervals" means not only exactly constant intervals, but also substantially constant intervals, or constant intervals containing errors of several percent to several tens of percent. The same thing can be applied to other expressions using "approximately".

Exemplary Embodiments

FIG. 1 is a diagram illustrating a schematic configuration of an imaging apparatus in accordance with an exemplary embodiment.

Imaging apparatus 200 in accordance with the present exemplary embodiment comprises: correction optical device 100 that holds lens 130 and moves lens 130 along a plane perpendicular to an optical axis; and image sensor 201. Image sensor 201 is fixed relative to imaging apparatus 200. An image is projected onto image sensor 201 through lens 130 of correction optical device 100. Correction optical device 100 controls the position of lens 130 to suppress an image blur caused due to a vibration or the like of imaging apparatus 200. Specifically, correction optical device 100 causes lens 130 to move translationally so that a blur of an image projected onto image sensor 201 is suppressed. A fluctuation of imaging apparatus 200 may be caused due to, for example, a motion of a user's hand grasping imaging apparatus 200 (the so-called camera shake).

In the present exemplary embodiment, the direction of the optical axis is referred to as a Z-axis direction, and the directions which are perpendicular to each other on a plane perpendicular to the optical axis are referred to as an X-axis direction and a Y-axis direction. Here, the X-direction is defined as a horizontal direction of image sensor 201. The Y-axis direction is defined as a vertical direction of image sensor 201. A plus-side direction of the Z-axis direction is defined as a direction opposite to the image sensor 201 side viewed from lens 130 in the direction of the optical axis. The plus-side direction of the Z-axis direction is referred to as the front, the forward or the front side. Oppositely, the minus-side direction of the Z-axis direction is referred to as the back, the backward or the back side. Although lens 13 is shown as a single lens in the drawings of the present exemplary embodiment for simplifying explanation, lens 130 may be configured by a plurality of lenses.

Figure 2:
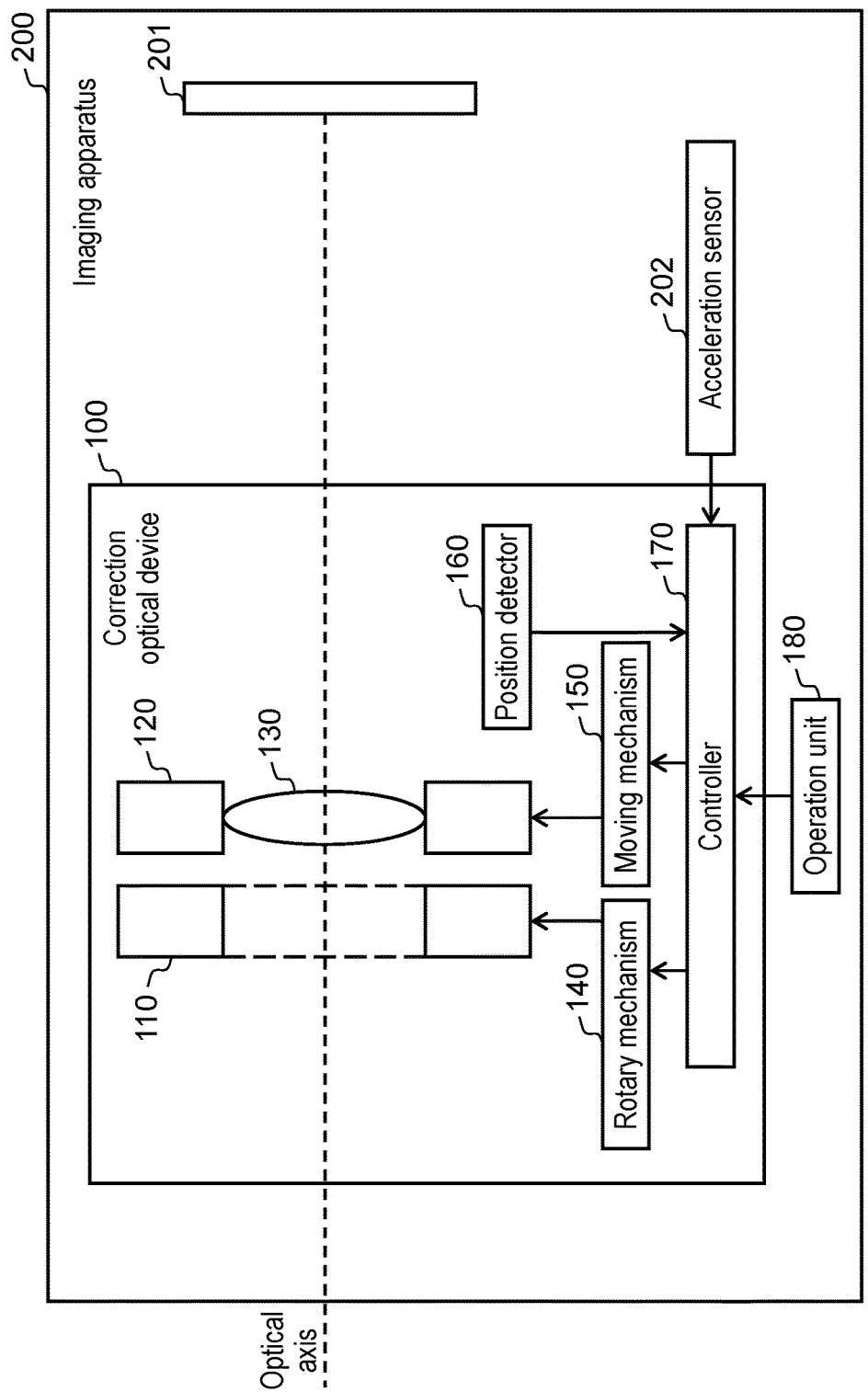
FIG. 2 is a block diagram illustrating a functional configuration of the imaging apparatus in accordance with the exemplary embodiment.

FIG. 2 is a block diagram illustrating a functional configuration of imaging apparatus 200 in accordance with the exemplary embodiment.

Imaging apparatus 200 comprises the above-described correction optical device 100, and image sensor 201, and further comprises acceleration sensor 202 and operation unit 180.

Acceleration sensor 202 detects an angular acceleration of imaging apparatus 200 caused due to a vibration or the like, and outputs an acceleration signal indicating the detected angular acceleration to correction optical device 100. Acceleration sensor 202 may be a sensor that can detect at least an angular acceleration. Acceleration sensor 202 may further detects, for example, a translational acceleration. That is, acceleration sensor 202 may be an acceleration sensor including an angular acceleration sensor or the like. Operation unit 180 receives an operation or an input by a user. For example, operation unit 180 receives an operation for turning on or turning off a power of imaging apparatus 200.

Correction optical device 100 comprises OIS (optical image stabilizer) lock ring 110, OIS frame 120, lens 130, rotary mechanism 140, moving mechanism 150, position detector 160, and controller 170.

OIS frame 120 is a movable member that moves along a plane perpendicular to the optical axis of correction optical device 100 (hereinafter referred to as the moving plane). It is possible by moving OIS frame 120 to change the relative positional relation between lens 130 and image sensor 201 which receives light through lens 130. Also, in the present exemplary embodiment, OIS frame 120 moves in the state of holding lens 130. In other words, it is possible to control the position of lens 130 by translationally moving OIS frame 120 in the moving plane. Incidentally, OIS frame 120 sometimes rotate in a rotational direction in the moving plane. In the following description, a movement of OIS frame 120 accompanying a rotational movement will occasionally be referred to as the translational movement of OIS frame 120 for simplicity. The above-mentioned moving plane is parallel to both the X-axis and the Y-axis.

Moving mechanism 150 is a mechanism for moving OIS frame 120, and may comprise, for example, an electromagnetic coil, a yoke, a magnet, and a spring. For example, moving mechanism 150 generates a magnetic force acting on the electromagnetic coil according to a moving signal from controller 170 so that OIS frame 120 is moved along the moving plane by the magnetic force.

OIS lock ring 110 is a restriction member that restricts the movement of OIS frame 120. OIS lock ring 110 is disposed rotatably about an axis which is parallel to the optical axis of correction optical device 100. The axis which is parallel to the optical axis may be the optical axis itself. A hollow is formed in OIS lock ring 110. OIS lock ring 110 is disposed so that lens 130 held by OIS frame 120 exposes from the hollow.

Also, OIS lock ring 110 rotates so that a first protrusion formed on OIS lock ring 110 reciprocates between a lock position (a restricting position) and an unlock position (a releasing position). When the first protrusion is in the lock position, OIS lock ring 110 restricts the movement of OIS frame 120. In other words, OIS frame 120 becomes a locked state. When the first protrusion is in the unlock position, on the other hand, OIS lock ring 110 releases the restriction of the movement of OIS frame 120. In other words, OIS frame 120 becomes an unlocked state. Details of the first protrusion, the lock position and the unlock position will be described later.

Rotary mechanism 140 is a mechanism for rotating OIS lock ring 110, and may comprise a motor or the like. The motor of rotary mechanism 140 generates a torque according to a rotation signal form controller 170. This torque causes OIS lock ring 110 to rotate. Rotational center of OIS lock ring 110 may, for example, be the optical axis.

Position detector 160 detects a position of the translationally moving OIS frame 120, and outputs a position signal indicating the detected position. Position detector 160 may comprise, for example, a sensor like a hall element, and a magnet.

Controller 170 acquires the acceleration signal output from acceleration sensor 202, and the position signal output from position detector 160. The position signal indicates a current position of OIS frame 120. The acceleration signal indicates an acceleration of OIS frame 120. Based on the position and acceleration of OIS frame 120, controller 170 outputs a moving signal to moving mechanism 150. An image blur can be corrected in this manner.

Upon receiving a power-on signal from operation unit 180, controller 170 outputs a rotation signal which causes rotary mechanism 140 to rotate OIS lock ring 110 so that the first protrusion moves to the unlock position. This makes OIS frame 120 to be in the unlocked state.

Upon receiving a power-off signal from operation unit 180, controller 170 outputs a rotation signal which causes rotary mechanism 140 to rotate OIS lock ring 110 so that the first protrusion moves to the lock position. This makes OIS frame 120 to be in the locked state.

Figure 3:
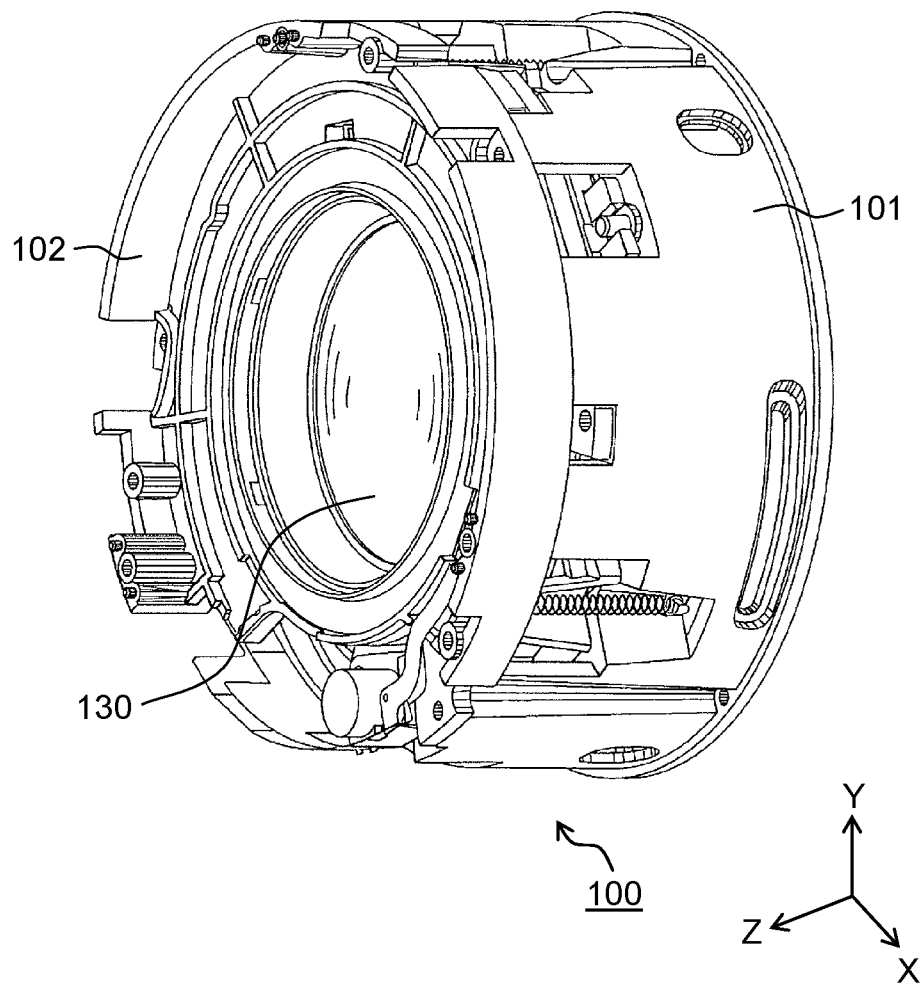
FIG. 3 is an external perspective view illustrating a correction optical device in accordance with the exemplary embodiment.

FIG. 3 is an external perspective view illustrating correction optical device 100.

Correction optical device 100 comprises first fixed unit 101 and second fixed unit 102 each of which has an approximately cylindrical shape. First fixed unit 101 is a holding member that holds OIS frame 120. OIS lock ring 110 is mounted on second fixed unit 102. Second fixed unit 102 is attached to first fixed unit 101 in a state in which OIS lock ring 110 is facing toward OIS frame 120. When second fixed unit 102 is attached to first fixed unit 101, lens 130 exposes forward from a hollow of second fixed unit 102.

Figure 4:
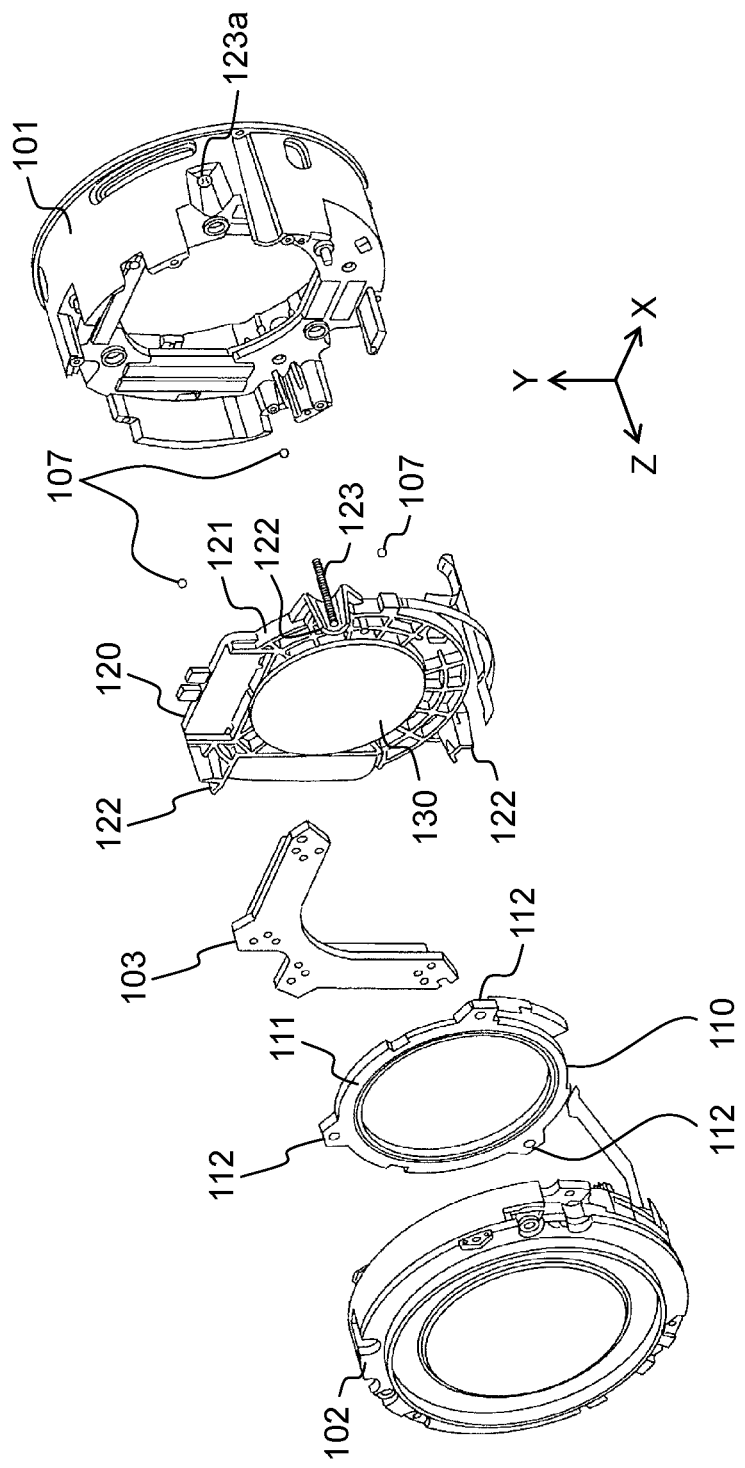
FIG. 4 is an exploded perspective view illustrating the correction optical device in accordance with the exemplary embodiment.

FIG. 4 is an exploded perspective view illustrating correction optical device 100.

Correction optical device 100 further comprises three balls 107, and yoke 103 which constitutes a part of moving mechanism 150.

OIS frame 120 has frame portion 121, and three second protrusions 122. Frame portion 121 is a frame portion that has an approximately annular shape and holds lens 130 at its center. Three second protrusions 122 are arranged at approximately constant intervals. Second protrusions 122 are protruding from frame portion 121 toward the front side in the optical axis direction (the plus side in the Z-axis direction). OIS frame 120 is attached to the front side of first fixed unit 101 in the state that three second protrusions 122 are protruding in the direction opposite to first fixed unit 101.

OIS frame 120 is attached to first fixed unit 101 using three balls 107 and three springs 123, which are elastic members. Specifically, three balls 107 are disposed between OIS frame 120 and first fixed unit 101. Second protrusions 122 and first fixed unit 101 (or the holding member) are connected through springs 123, which are elastic members. More specifically, one end of each spring 123 engages with an end of one second protrusion 122. The other end of each spring 123 engages with engaging portion 123a of first fixed unit 101 corresponding to the one second protrusion 122. With this structure, rolling of three balls allows OIS frame 120 to be moved along first fixed unit 101. Also, the movement of OIS frame 120 can be suppressed by the elastic forces of three springs 123. Consequently, OIS frame 120 can be held to be freely fluctuate. Accordingly, OIS frame 120 can be translationally moved by a magnetic force or the like.

Yoke 103 is attached to the front side of an edge of OIS frame 120 so as not to overlap lens 130.

OIS lock ring 110 has ring portion 111 having an approximately annular shape, and three first protrusions 112. First protrusions 112 are protruding outward from the outer periphery of ring portion 111. Three first protrusions 112 are arranged at approximately constant intervals, and are protruding from the outer periphery of ring portion 111 in directions opposite to the center of ring portion 111.

On the back side of second fixed unit 102, the above-described OIS lock ring 110 is mounted. Second fixed unit 102 is attached to the front side of first fixed unit 101 in the state that OIS lock ring 110 faces toward first fixed unit 101. In this state, OIS frame 120 attached to first fixed unit 101 and yoke 103 are covered by second fixed unit 102. Also, in the state that second fixed unit 102 is attached to first fixed unit 101, OIS lock ring 110 is disposed so that OIS frame 120 and yoke 103 are located between OIS lock ring 110 and first fixed unit 101. Also, in the state that second fixed unit 102 is attached to first fixed unit 101, OIS lock ring 110 becomes in a state of being surrounded by three second protrusions 122 of OIS frame 120 on a plane perpendicular to the optical axis. In other words, OIS lock ring 110 is disposed on the front side of OIS frame 120 so that lens 130 exposes forward from the hollow of ring portion 111 and that three second protrusions 122 surround OIS lock ring 110.

Since OIS lock ring 110 is surrounded by three second protrusions 122, movement of OIS frame 120 can be restricted at or near a center of an area surrounded by these second protrusions 122.

FIG. 5 is a side view illustrating correction optical device 100. In FIG. 5, first fixed unit 101 and second fixed unit 102 are omitted, and only the internal structure of correction optical device 100 is illustrated.

As shown in FIG. 5, motor 104 constituting rotary mechanism 140 is disposed on the front side of OIS lock ring 110 in the optical axis direction (the plus side in the Z-axis direction). OIS lock ring 110 rotates about an axis parallel to the optical axis by a torque of motor 104.

A plurality of magnets 106b constituting moving mechanism 150 are disposed on the back side of OIS frame 120. At least one electromagnetic coil constituting moving mechanism 150 is disposed to oppose to the plurality of magnets 106b. In FIG. 5, the electromagnetic coil is hidden behind OIS frame 120. OIS frame 120 is translationally moved by magnetic forces of the plurality of magnets 106b and a magnetic force generated by the electromagnetic coil according to the moving signal from controller 170.

A plurality of magnets 106a constituting position detector 160 are disposed on the back side of OIS frame 120. Also, a plurality of sensors (e.g., hall elements) 105 constituting position detector 160 are attached to the back surface of OIS frame 120. Here, OIS frame 120 is reciprocately attached to first fixed unit 101 with three balls 107 and three springs 123. With this configuration, OIS frame 120 can move translationally along the moving plane. Position detector 160 detects changes in the magnetic forces of the plurality of magnets 106a by the plurality of sensors 105 attached to the back surface of OIS frame 120. With this detection, position detector 160 detects the position of the translationally moving OIS frame 120.

Figure 6A:
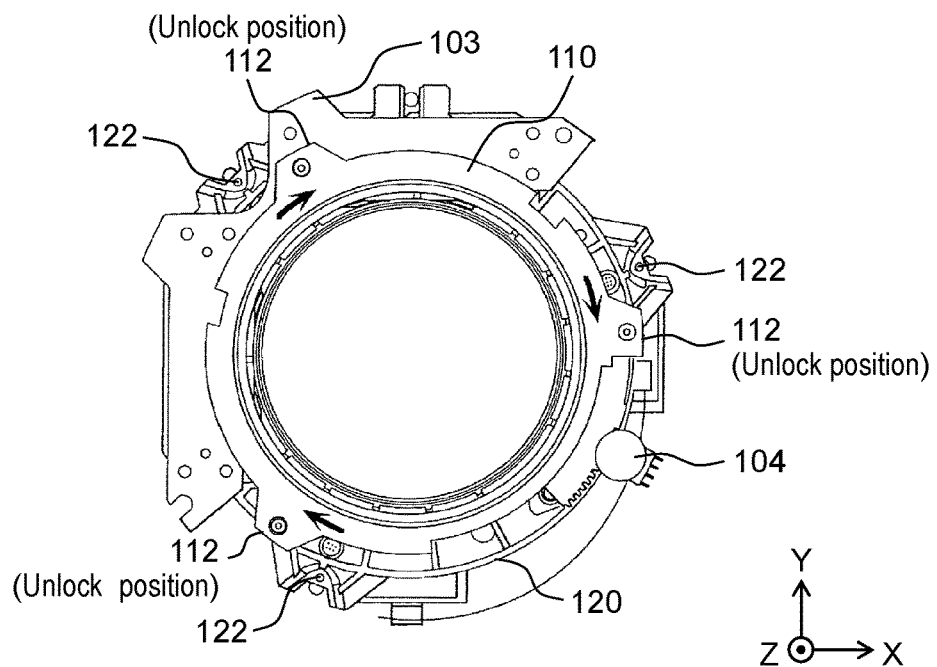
FIG. 6A is a front view of the correction optical device in accordance with the exemplary embodiment in an unlocked state.
Figure 6B:
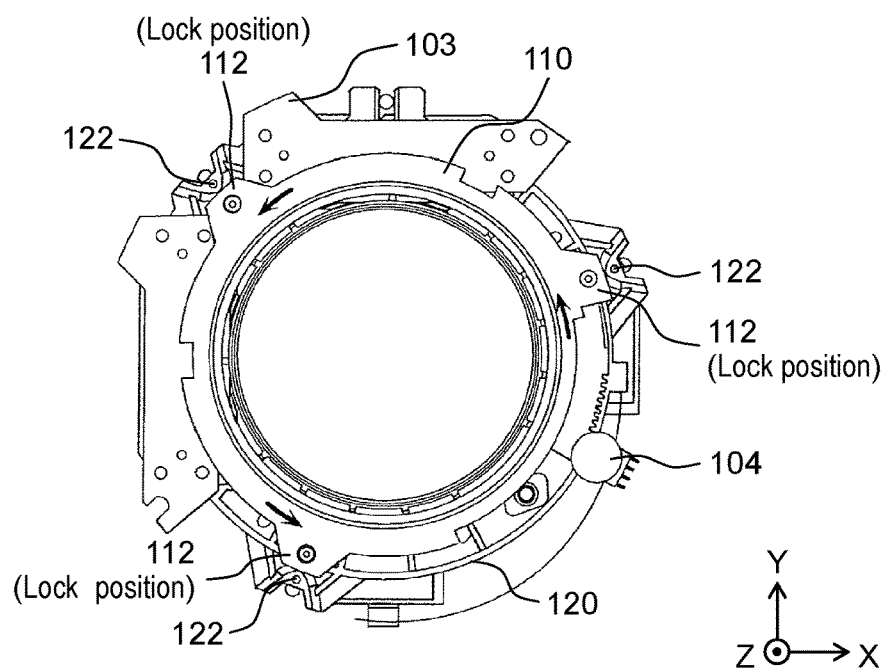
FIG. 6B is a front view of the correction optical device in accordance with the exemplary embodiment in a locked state.

FIG. 6A is a front view of correction optical device 100 in the unlocked state. FIG. 6B is a front view of correction optical device 100 in the locked state. In FIGS. 6A and 6B, first fixed unit 101 and second fixed unit 102 are omitted, and only the internal structure of correction optical device 100 viewed from the front side in the direction of the optical axis is shown.

OIS lock ring 110 in accordance with the present exemplary embodiment rotates so that first protrusion 112 formed on OIS lock ring 110 reciprocates between the lock position (the restricting position) and the unlock position (the releasing position).

By the counter-clockwise rotation of OIS lock ring 110, as shown in FIG. 6B, three first protrusions 112 of OIS lock ring 110 reach their respective lock positions. In this state, three first protrusions 112 respectively oppose to three second protrusions 122 formed on OIS frame 120. This restricts the movement of OIS frame 120 along the opposing direction of first and second protrusions 112 and 122. Since the movement of OIS frame 120 is restricted in each of the opposing directions of three first protrusions 112 and three second protrusions 122, the position of OIS frame 120 in the moving plane is restricted. Accordingly, OIS frame 120 is brought to the locked state.

On the other hand, by the clockwise rotation of OIS lock ring 110, as shown in FIG. 6A, three first protrusions 112 of OIS lock ring 110 reach their respective unlock positions. In this state, three first protrusions 112 do not respectively oppose to, or are in respectively non-opposing relations to, three second protrusions 122 formed on OIS frame 120. This releases the restriction of the movement of OIS frame 120 along each of the opposing directions of first and second protrusions 112 and 122. That is, OIS frame 120 is brought to the unlocked state.

Figure 7A:
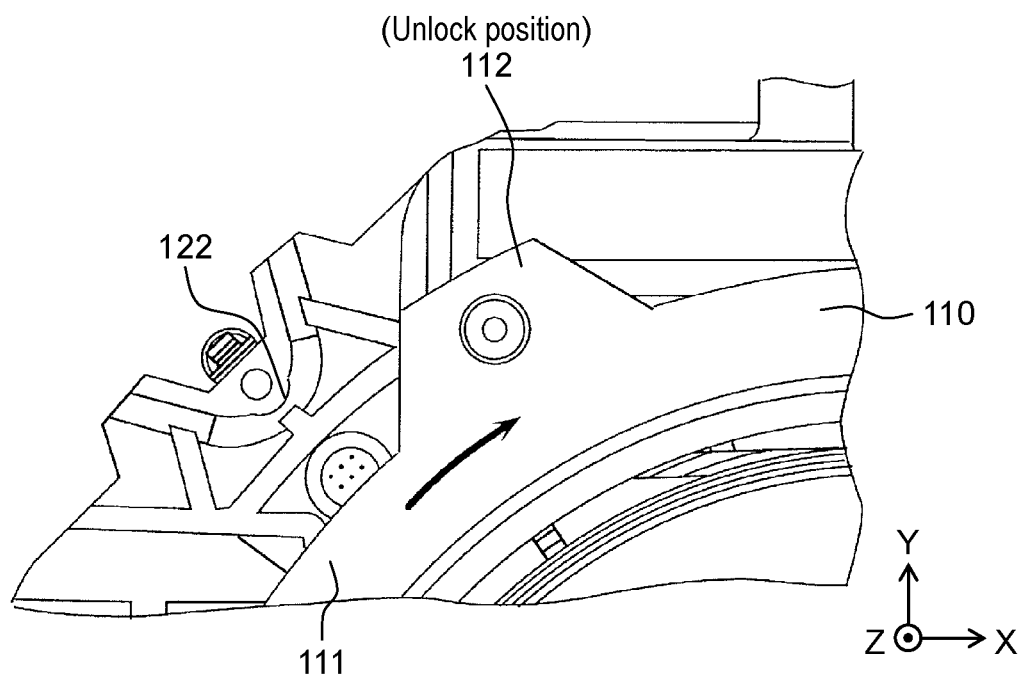
FIG. 7A is an enlarged partial front view of the correction optical device in accordance with the exemplary embodiment in an unlocked state.
Figure 7B:
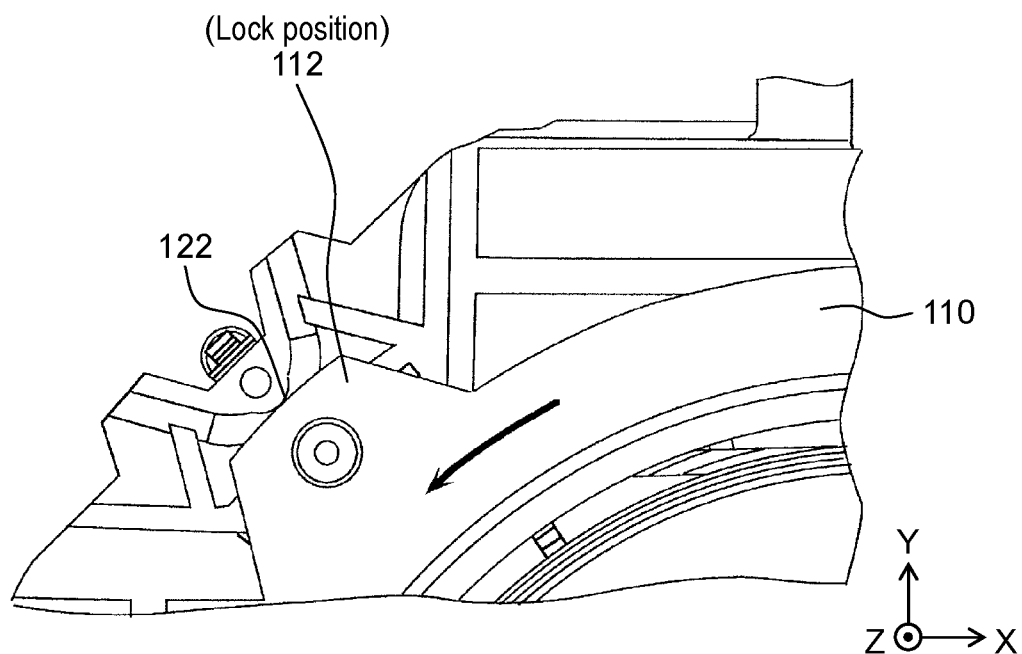
FIG. 7B is an enlarged partial front view of the correction optical device in accordance with the exemplary embodiment in a locked state.

FIG. 7A is an enlarged partial front view of correction optical device 100 in the unlocked state. FIG. 7B is an enlarged partial front view of correction optical device 100 in the locked state. Each of FIGS. 7A and 7B shows an enlarged view of a pair of protrusions (i.e., a pair of first and second protrusions 112 and 122) shown in FIGS. 6A and 6B.

When OIS frame 120 is in the unlocked state, as shown in FIG. 7A, there is a gap between second protrusion 122 of OIS frame 120 and ring portion 111 of OIS lock ring 110. Accordingly, OIS frame 120 can move translationally within the gap to correct an image blur.

On the other hand, when OIS frame 120 is in the locked state, as shown in FIG. 7B, the gap between second protrusion 122 of OIS frame 120 and OIS lock ring 110 (specifically, first protrusion 112) is much smaller than that in the unlocked state. There may be no gap, but second protrusion 122 of OIS frame 120 and first protrusion 112 of OIS lock ring 120 may be in contact with each other. Accordingly, OIS frame 120 cannot move translationally, or its movement is restricted. Consequently, OIS frame 120 cannot perform the image blur correction in this state.

When OIS frame 120 is in the locked state, or the first protrusion 112 is in the lock position, a force that causes first protrusion 112 and second protrusion 122 to push against each other is sometimes generated between first protrusion 112 and second protrusion 122. For example, when imaging apparatus vibrates, a force that causes the first protrusion 112 and second protrusion 122 to push against each other is generated by collision of first protrusion 112 and second protrusion 122.

When imaging apparatus 200 is in the power-off state, OIS frame 120 is in the locked state. However, since motor 104 is not supplied with power in the power-off state of imaging apparatus 200, motor 104 cannot generate a torque for keeping OIS frame 120 in the locked state. Accordingly, when imaging apparatus 200 is vibrated, it is likely that OIS lock ring 110 is rotated by the vibration, which would cause first protrusion 112 to move to the unlock position. In other words, it is supposed that the state of OIS frame 120 unintentionally changes from the locked state to the unlocked state.

However, first protrusion 112 and second protrusion 122 in accordance with the present exemplary embodiment are formed into such shapes that generate, when the above-mentioned force is generated, a component force that acts on first protrusion 112 in the direction from the unlock position toward the lock position. With this configuration, it is possible to prevent the above-described unintentional transition of the state of OIS frame 120 from the locked state to the unlocked state when imaging apparatus 200 is in the power-off state.

Figure 8:
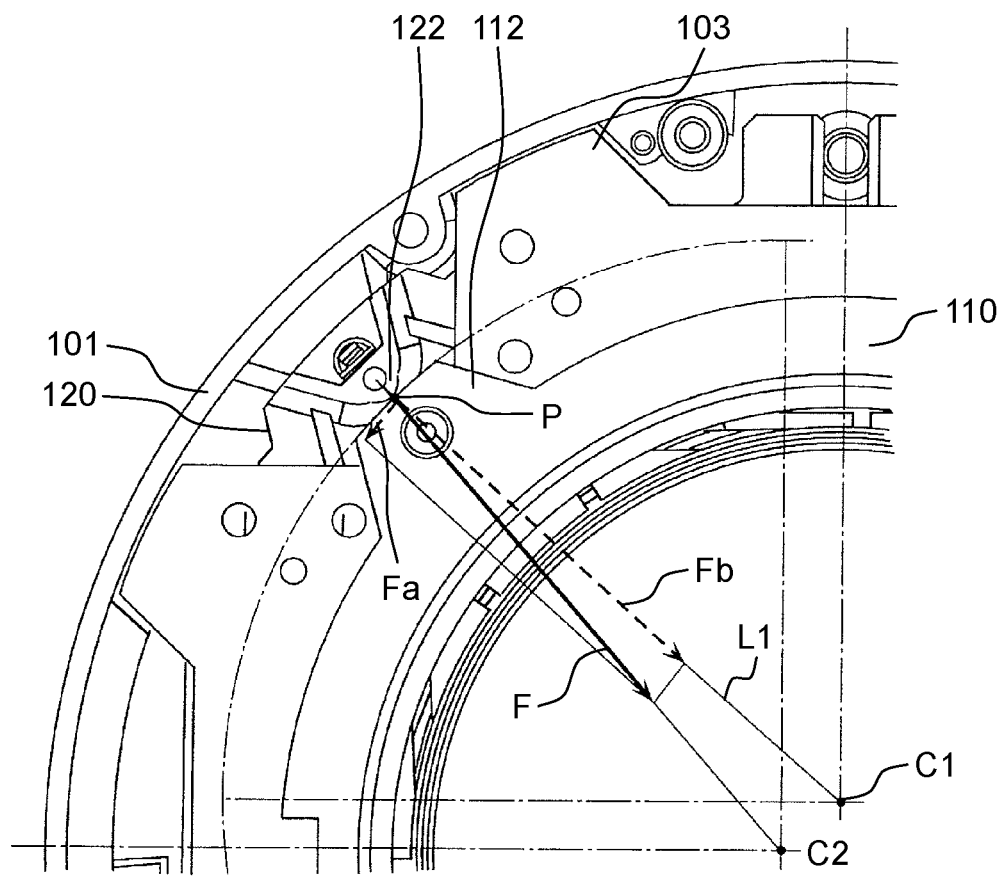
FIG. 8 is a diagram illustrating a component force received by a lock ring in accordance with the exemplary embodiment.
Figure 9A:
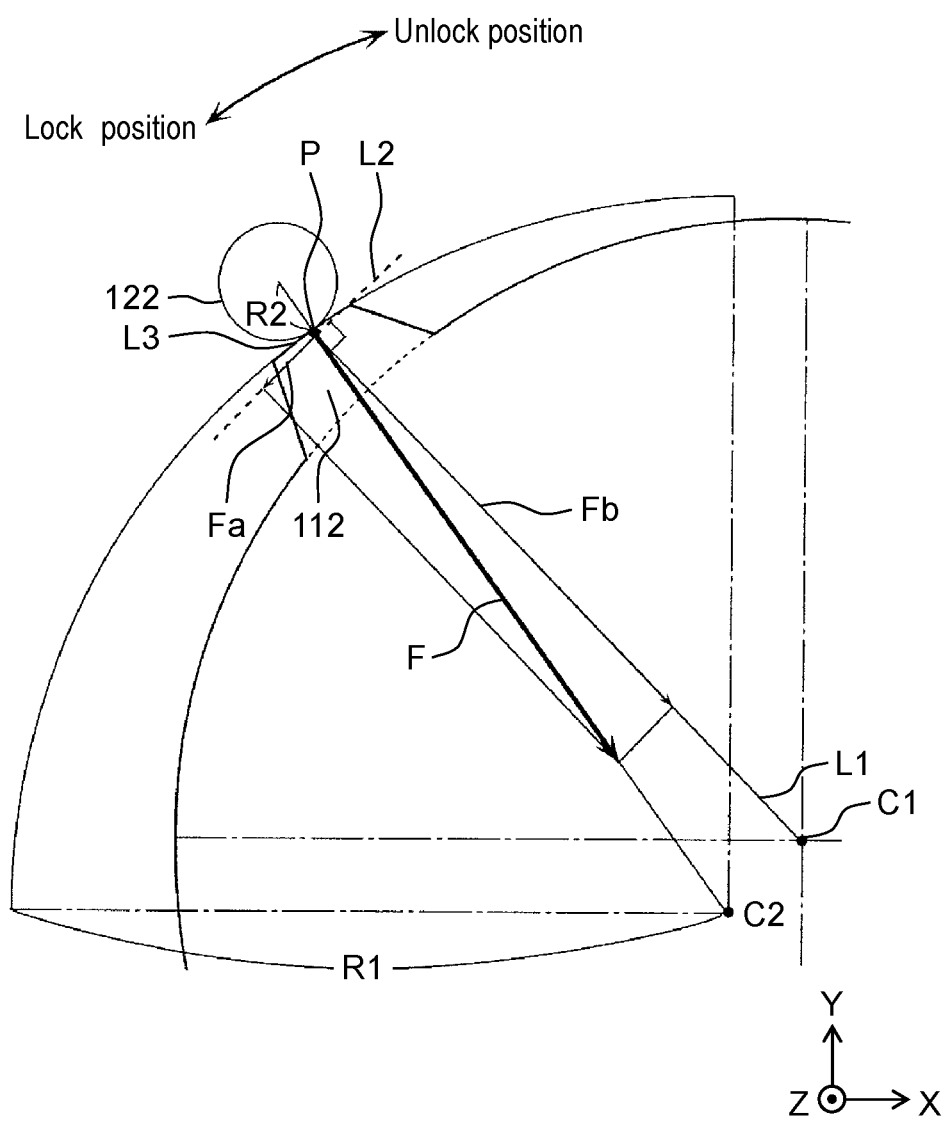
FIG. 9A is a diagram schematically illustrating the configuration illustrated in FIG. 8.
Figure 9B:
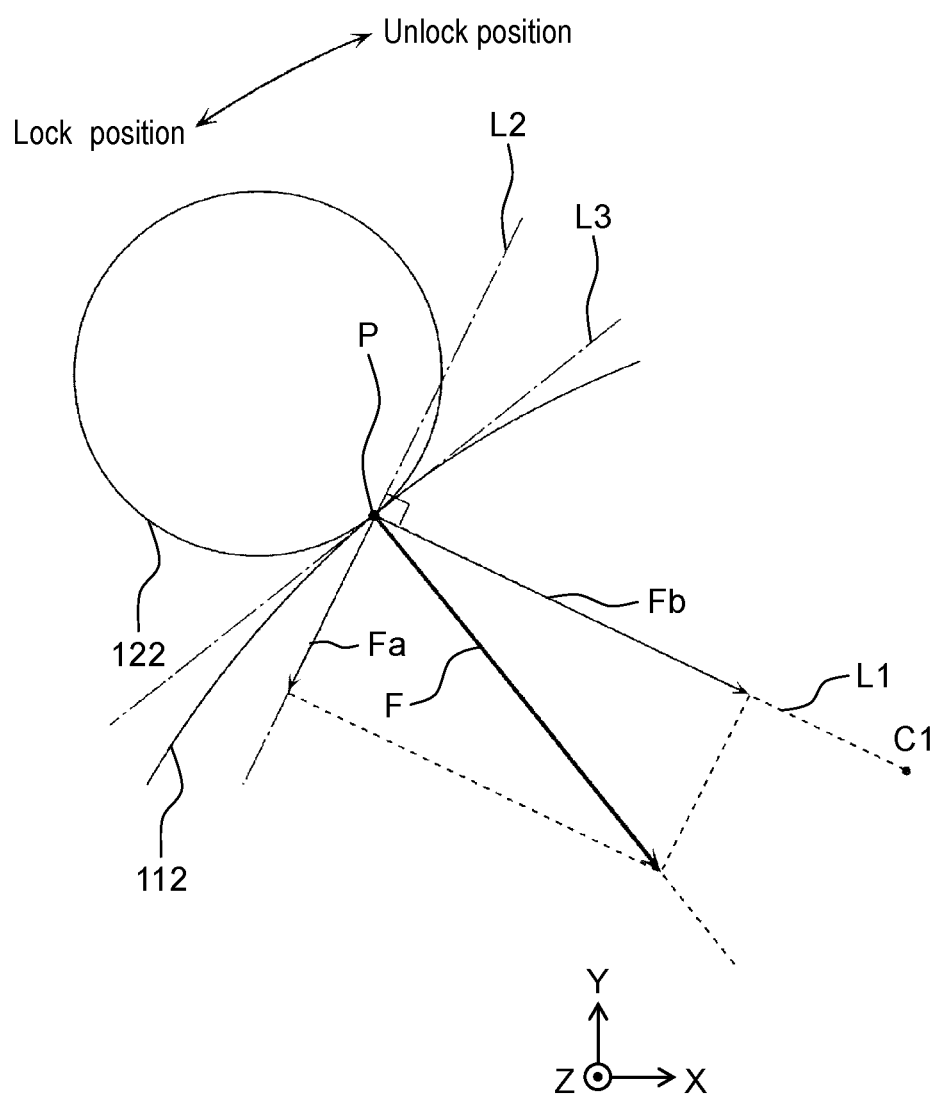
FIG. 9B is another diagram schematically illustrating the configuration illustrated in FIG. 8.

FIG. 8 is a diagram illustrating a component force received by OIS lock ring 110 when first protrusion 112 and second protrusion 122 collide with each other. FIG. 9A is a diagram schematically illustrating the configuration illustrated in FIG. 8. FIG. 9B is an enlarged view of a part of FIG. 9A. Each of FIGS. 8, 9A and 9B shows structures of OIS lock ring 110, OIS frame 120 and the like viewed from the front side in the direction of the optical axis. Also, each of FIGS. 9A and 9B schematically shows a partial contour of OIS lock ring 110 and a contour of second protrusion 122 of OIS frame 120.

As described above, when imaging apparatus 200 vibrates, first protrusion 112 and second protrusion 122 collide with other to generate a force that causes the first and second protrusions to push against each other in their opposing direction. FIG. 8 shows force F generated in the opposing direction of first protrusion 112 and second protrusion 122. Force F is a force that second protrusion 122 pushes first protrusion 112. Force F is generated in the opposing direction of first protrusion 112 and second protrusion 122, or in the normal direction with respect to a tangent plane at contact point P of first protrusion 112 and second protrusion 122.

In the present exemplary embodiment, the contour shape of each of first protrusion 112 and second protrusion 122 is an arc in a cross-section passing through contact point P viewed from the direction of the optical axis. In other words, a contour shape at an end of each of first protrusion 112 and second protrusion 122 is an arc. As shown in FIG. 9A, radius R1 of the arc of first protrusion 112 is larger than radius R2 of the arc of second protrusion 122. Also, as shown in FIG. 8 and FIG. 9A, center C2 of the arc of first protrusion 112 is in a position shifted from rotational center C1 of OIS lock ring 110.

In FIGS. 9A and 9B, second protrusion 122 is illustrated as a circle for simplicity. In actual, the shape of the contour of second protrusion 122 at a part on the first protrusion 112 side corresponds to an arc which is a part of the circle on the first protrusion 112 side.

Additionally, in the present exemplary embodiment, as shown in FIGS. 9A and 9B, straight line L1 is defined as a straight line which connects contact point P and rotational center C1 of OIS lock ring 110. Also, straight line L2 is defined as a straight line which passes through contact point P and is perpendicular to straight line L1. Tangent line L3 is a tangent line to first and second protrusions 112 and 122 at contact point P. Tangent line L3 is inclined relative to straight line L2. Specifically, tangent line L3 is inclined so that an unlock position side of tangent line L3 comes closer to rotational center C1 of OIS lock ring 110 than a lock position side of tangent line L3. In other words, first protrusion 112 and second protrusion 122 in accordance with the present exemplary embodiment are formed into such shapes that cause tangent line L3 to be inclined as described above. For example, in the present exemplary embodiment, as shown in FIG. 9A, center C2 of the arc of first protrusion 112 is shifted from rotational center C1 of OIS lock ring 110. With this configuration, tangent line L3 is inclined relative to straight line L2.

Now, force F will be considered separately in the direction of straight line L1 and in the direction of straight line L2. Of the components of force F, a component in the direction of straight line L1 is denoted by component force Fb, and a component in the direction of straight line L2 is denoted by component force Fa. Component force Fa is generated to act on first protrusion 112 in the direction from the unlock position toward the lock position.

When first protrusion 112 and second protrusion 122 collide with each other, component force Fa acts on first protrusion 112 in the direction to rotate OIS lock ring 110 toward the lock position side (the counter-clockwise in the present exemplary embodiment). In this manner, a force to keep OIS lock ring 110 in the lock position is applied to OIS lock ring 110 even if imaging apparatus 200 vibrates during or when imaging apparatus 200 is in the power-off state.

A stopper is formed in correction optical device 100 in accordance with the present exemplary embodiment. That is, when first protrusion 112 of OIS lock ring 110 is in the lock position, further counter-clockwise rotation of OIS lock ring 110 is restricted by the stopper. Accordingly, even if OIS lock ring 110 is driven to rotate counter-clockwise when OIS frame 120 is already in the locked state, first protrusion 112 is retained in the lock position.

As described above, it is possible to prevent first protrusion 112 of OIS lock ring 110 from moving toward the unlock position side due to vibration or the like. In other words, it is possible to prevent the state of OIS frame 120 from being unintentionally changed from the locked state to the unlocked state.

Advantageous Effects

As described above, correction optical device 100 in accordance with the present exemplary embodiment is a correction optical device that corrects an image blur. Correction optical device 100 comprises OIS frame 120, which is a movable member, and OIS lock ring 110, which is a restriction member. OIS frame 120 changes the relative positional relation between lens 130 and image sensor 201. OIS frame 120 moves along a plane perpendicular to the optical axis of correction optical device 100. Image sensor 201 receives light through lens 130. OIS lock ring 110 is disposed rotatably about an axis parallel to the optical axis. OIS lock ring 110 restricts the movement of OIS frame 120.

OIS lock ring 110 rotates so that first protrusion 112 formed on OIS lock ring 110 reciprocates between the lock position and the unlock position. When first protrusion 112 is in the lock position, first protrusion 112 and second protrusion 122 formed on OIS frame 120 oppose to each other. With this configuration, OIS lock ring 110 restricts the movement of OIS frame 120 along the opposing direction in which first and second protrusions 112 and 122 are opposing to each other. When first protrusion 112 is in the unlock position, on the other hand, first protrusion 112 and second protrusion 122 do not oppose to each other. With this configuration, OIS lock ring 110 releases the restriction of the movement of OIS frame 120 along the opposing direction. Also, first protrusion 112 and second protrusion 122 are formed into such shapes that generate component force Fa acting on first protrusion 112 in the direction form the unlock position toward the lock position when force F causing first protrusion 112 and second protrusion 122 to push against each other along the opposing direction is generated between first protrusion 112 and second protrusion 122.

When first protrusion 112 is in the lock position, or the movement of OIS frame 120 is restricted, force F causing first protrusion 112 and second protrusion 122 to push against each other is generated between first protrusion 112 and second protrusion 122 due to a vibration or the like. In this state, component force Fa acts on first protrusion 112 in the direction from the unlock position to the lock position. Accordingly, it is possible to prevent OIS lock ring 110 from being rotated so that first protrusion 112 moves to the unlock position to unintentionally release the restriction of the movement of OIS frame 120. Also, unintentional release of the restriction of OIS frame 120 can be prevented by the shapes of first and second protrusions 112 and 122, without requiring other members such, for example, as a ball plunger. Accordingly, the structure of correction optical device 100 can be simplified.

The shapes of first and second protrusions 112 and 122 in accordance with the present exemplary embodiment viewed from the optical axis are such that tangent line L3 to first and second protrusions 112 and 122 at contact point P is inclined relative to straight line L2 so that the unlock position side of tangent line L3 becomes closer to rotational center C1 than the lock position side of tangent line L3. Contact point P is a point at which first protrusion 112 and second protrusion 122 are in contact with each other when first protrusion 112 is in the lock position. Straight line L1 is a straight line that connects contact point P to rotational center C1 of OIS lock ring 110. Straight line L2 is a straight line which is perpendicular to straight line L1.

With this configuration, component force Fa in the direction from the unlock position toward the lock position can be easily and appropriately generated, as shown in FIG. 8 to FIG. 9B.

According to the present exemplary embodiment, first protrusions 112 and second protrusions 122 oppose to each other at three positions in the locked state. With this configuration, even if an acceleration is applied in any direction in the moving plane, adequately large force F is applied at contact point P of at least one position. In other words, first protrusions 112 and second protrusions 122 opposing to each other at three or more positions allow OIS lock ring 110 to be stably retained in the lock position.

Modifications

In imaging apparatus 200 in accordance with the above-described exemplary embodiment, lens 130 is moved relative to image sensor 201 fixed to imaging apparatus 200. On the other hand, image sensor 201 may be moved along the moving plane relative to fixed lens 130, as in an imaging apparatus in accordance with the present modification.

FIG. 10 is a diagram illustrating a configuration of an imaging apparatus in accordance with a modification of the present exemplary embodiment.

Imaging apparatus 200a in accordance with the present modification comprises correction optical device 100a, and lens 130. Correction optical device 100a holds image sensor 201. Also, correction optical device 100a moves image sensor 201 along a plane perpendicular to the optical axis. Differently from the above-described exemplary embodiment, lens 130 is fixed to imaging apparatus 200a.

Correction optical device 100a in accordance with the present modification controls the position of image sensor 201 to suppress an image blur caused by a vibration or the like of imaging apparatus 200a. Specifically, correction optical device 100a translationally moves image sensor 201 so that a blur of an image projected onto image sensor 201 is suppressed.

Correction optical device 100a comprises, similarly to the above-described exemplary embodiment, a restriction member corresponding to OIS lock ring 110, a movable member corresponding to OIS frame 120, and image sensor 201. The movable member holds image sensor 201, and moves in the state of holding image sensor 201. This movement of image sensor 201 is a translational movement in a plane perpendicular to the optical axis.

The restriction member rotates, similarly to the above-described exemplary embodiment, so that a first protrusion formed on the restriction member reciprocates between a lock position and an unlock position. When the first protrusion is in the lock position, the first protrusion and a second protrusion formed on the movable member oppose to each other. In this state, the restriction member restricts a movement of the movable member along the opposing direction of the first and second protrusions. When the first protrusion is in the unlock position, on the other hand, the first protrusion and the second protrusion do not oppose to each other. In this state, the restriction member releases the restriction of the movement of the movable member along the opposing direction. Also, the first and second protrusions are formed into such shapes that generate a component force acting on the first protrusion in the direction from the unlock position toward the lock position when a force causing the first and second protrusions to push against each other along the opposing direction is generated between the first and second protrusions.

In other words, correction optical device 100a in accordance with the present modification differs from the above-described exemplary embodiment only in the point that image sensor 201 is translationally moved instead of lens 130. The other parts of configuration of correction optical device 100a in accordance with the present modification may be made substantially the same as those of correction optical device 100 in accordance with the above-described exemplary embodiment.

Accordingly, the same actions and advantageous effects as those of the above-described exemplary embodiment can be obtained also in accordance with the present modification.

Other Exemplary Embodiments

In the above description, an exemplary embodiment and its modification have been described as examples of techniques disclosed in the present application. However, the techniques in accordance with the present disclosure are not limited to the above-described exemplary embodiment and modification, and may be applied to other exemplary embodiments in which modifications, substitutions, additions, and/or omissions are made. Also, the structural components described in the above exemplary embodiment and modification may be appropriately combined to configure a new exemplary embodiment.

Therefore, other exemplary embodiments will hereinafter be described.

In the above-described exemplary embodiment and modification, OIS frame 120 becomes the locked state when first protrusion 112 is in the lock position. However, according to the present disclosure, this locked state may not be limited to the state in which OIS frame 120 is fixed. In other words, the locked state may be a state in which a movement of OIS frame 120 is restricted more than in the unlocked state.

Also, in the above-described exemplary embodiment and modification, the contour of each of first protrusion 112 and second protrusion 122 is an arc shape in a cross-section passing through contact point P viewed from the direction of the optical axis. However, the contour shape may not be limited to an arc. For example, the contour shape may not be an arc, but may be a straight line or an elliptic arc. Also, the contours of both first and second protrusions 112 and 122 may not be arc shapes, but may be different from each other, as, for example, one is an arc and the other is a straight line.

Also, in the above-described exemplary embodiment and modification, the radius of the arc of first protrusion 112 is larger than the radius of the arc of second protrusion 122. However, the present disclosure is not limited to this. On the contrary, the radius of the arc of second protrusion 122 may be larger than the radius of the arc of first protrusion 112.

Also, in the above-described exemplary embodiment and modification, OIS frame 120 becomes the locked state when the power of the imaging apparatus is turned off, and OIS frame 120 becomes the unlocked state when the power of the imaging apparatus is turned on. However, the present disclosure is not limited to this. For example, the state of OIS frame 120 may be switched between the locked state and the unlocked state according to a user's operation received by operation unit 180.

Also, in the above-described exemplary embodiment and modification, the counter-clockwise rotation of OIS lock ring 110 causes first protrusion 112 to move toward the lock position, and the clockwise rotation of OIS lock ring 110 causes first protrusion 112 to move toward the unlock position. However, the present disclosure is not limited to this. On the contrary, the counter-clockwise rotation of OIS lock ring 110 may cause first protrusion 112 to move toward the unlock position, and the clockwise rotation of OIS lock ring 110 may cause first protrusion 112 to move toward the lock position.

Also, in the above-described exemplary embodiment and modification, the correction optical device has OIS frame 120 as the movable member, and OIS lock ring 110 as the restriction member. OIS frame 120 is an example of the movable member. OIS lock ring 110 is an example of the restriction member. The movable member may be a member having any shape as far as it can hold lens 130 and image sensor 201. In other words, the movable member may not have the annular shape frame portion 121. Similarly, the restriction member may be a member having any shape as far as it can restrict the movement of the movable member. In other words, the restriction member may not have the annular shape ring portion 111 like OIS lock ring 110.

In the foregoing description, the correction optical devices in one or more aspects of the present disclosure have been described based on exemplary embodiments and their modifications. However, the present disclosure may not be limited to these exemplary embodiments and modifications. It should be understood that the scope of the present disclosure may include those obtained by modifying the above-described exemplary embodiments and modifications in various manners conceived by any person skilled in the art, and embodiments constituted by combining the components of the above-described exemplary embodiments and modifications.

INDUSTRIA APPLICABILITY

The present disclosure, which provides the advantageous effect of simplifying the structure, is applicable to cameras that take, for example, moving pictures or still pictures, or the like.

REFERENCE MARKS IN THE DRAWINGS 100, 100a correction optical device
101 first fixed unit (holding member)
102 second fixed unit
103 yoke
104 motor
105 sensor
106a, 106b magnet
107 ball
110 OIS lock ring (restriction member)
111 ring portion 112 first protrusion
120 OIS frame (movable member)
121 frame portion
122 second protrusion
123 spring (elastic member)
123a engaging portion
130 lens
140 rotary mechanism
150 moving mechanism
160 position detector
170 controller
180 operation unit
200, 200a imaging apparatus
201 image sensor
202 acceleration sensor
C1 rotational center
C2 center
F force
Fa, Fb component force
L1 straight line
L2 straight line
L3 tangent line
P contact point
R1, R2 radius

The invention claimed is:

1. A correction optical device for correcting an image blur, comprising:
a movable member that moves along a plane perpendicular to an optical axis of the correction optical device to change a relative positional relation between a lens and an image sensor which receives light through the lens; and
a restriction member that is disposed rotatably about an axis parallel to the optical axis to restrict a movement of the movable member,
wherein the restriction member rotates so that a first protrusion formed on the restriction member reciprocates between a restricting position and a releasing position;
wherein, when the first protrusion is in the restricting position, the first protrusion and a second protrusion formed on the movable member oppose to each other to restrict a movement of the movable member along an opposing direction in which the first and second protrusions oppose to each other; and
wherein, when the first protrusion is in the releasing position, the first protrusion and the second protrusion do not oppose to each other to release restriction of the movement of the movable member along the opposing direction, and
wherein the first protrusion and the second protrusion are formed into such shapes that generate a component force acting on the first protrusion in a direction from the releasing position toward the restricting position when a force causing the first protrusion and the second protrusion to push against each other along the opposing direction is generated between the first protrusion and the second protrusion.

2. The correction optical device according to claim 1, wherein shapes of the first and second protrusions viewed from a direction of the optical axis are such that a tangent line to the first and second protrusions at a contact point at which the first protrusion is in contact with the second protrusion when the first protrusion is in the restricting position is inclined relative to a straight line which is perpendicular to a straight line connecting the contact point and a rotational center of the restriction member so that the tangent line is closer on a side of the releasing position to the rotational center than on a side of the restricting position.

3. The correction optical device according to claim 2, wherein a contour of each of the first and second protrusions passing through the contact point viewed from the direction of the optical axis is an arc.

4. The correction optical device according to claim 3, wherein a radius of the arc of the first protrusion is larger than a radius of the arc of the second protrusion.

5. The correction optical device according to claim 1, wherein the movable member holds the lens, and moves in a state of holding the lens.

6. The correction optical device according to claim 5, wherein the restriction member has a ring portion having an approximately annular shape, and a plurality of the first protrusions that are protruding outward from a periphery of the ring portion,
wherein the movable member has a frame portion having an approximately annular shape and holding the lens at a center of the ring portion, and a plurality of the second protrusions that are protruding from the frame portion in a direction of the optical axis, and
wherein the restriction member is disposed relative to the movable member so that the lens is exposed from a hollow of the ring portion and that the plurality of the second protrusions surround the restriction member.

7. The correction optical device according to claim 6, further comprising:
a holding member that holds the movable member; and;
a plurality of balls disposed between the movable member and the holding member,
wherein each of the plurality of the second protrusions is connected to the holding member through an elastic member.

8. The correction optical device according to claim 1, wherein at least three first protrusions each being the first protrusion are formed on the restriction member,
wherein at least three second protrusions each being the second protrusion are formed on the movable member, and
wherein, when the first protrusions are each in the restricting position, the first protrusions and the second protrusions oppose to each other at three or more positions.

9. The correction optical device according to claim 1, wherein the movable member holds the image sensor, and moves in a state of holding the image sensor.

10. An imaging apparatus comprising the correction optical device according to claim 1.

* * * * *